Figure 1:
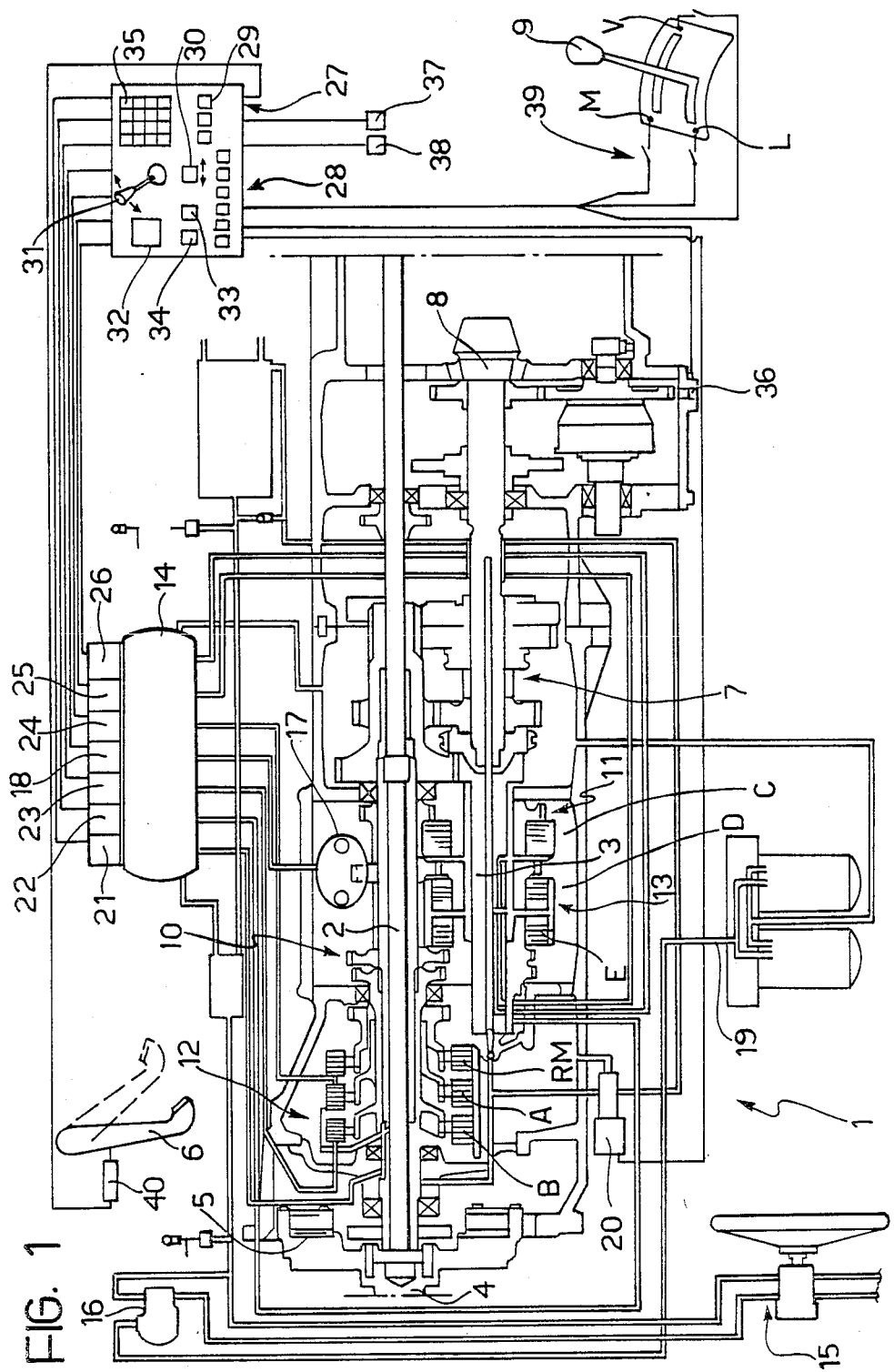

United States Patent [19]

Amedei et al.

[11] Patent Number: 4,873,880

[45] Date of Patent: Oct. 17, 1989

[54] GEARBOX WITH ELECTRONICALLY-CONTROLLED HYDRAULIC CLUTCHES, FOR AGRICULTURAL TRACTORS AND SIMILAR VEHICLES

[75] Inventors: Giuseppe Amedei; Giovanni Tornactore, both of Torino, Italy

[73] Assignee: Fiatgeotech-Tecnologie per la terra S.p.A., Modena, Italy

[21] Appl. No.: 176,549

[22] Filed: Apr. 1, 1988

[30] Foreign Application Priority Data

Apr. 1, 1988 [IT] Italy .............................. 67258 A/87

[51] Int. Cl.⁴ ............................................. F16H 5/48
[52] U.S. Cl. ..................................... 74/336 R; 74/740
[58] Field of Search .................... 74/335, 336 R, 337, 74/740

[56] References Cited

U.S. PATENT DOCUMENTS

| | | | |
|---|---|---|---|
| 3,659,479 | 5/1972 | Kiss .................................... | 74/335 X |
| 3,945,265 | 3/1976 | Bell et al. .............................. | 74/335 |
| 4,175,448 | 11/1979 | Loew et al. ........................ | 74/335 X |
| 4,203,375 | 5/1980 | Miller .................................... | 74/335 |
| 4,275,608 | 6/1981 | Brancolini ......................... | 74/740 X |
| 4,690,017 | 9/1987 | Taniguchi et al. ............... | 74/740 X |
| 4,722,247 | 2/1988 | Schindo et al. ................... | 74/740 X |
| 4,724,725 | 2/1988 | Harada et al. .................... | 74/740 X |

Primary Examiner—Dwight G. Diehl
Attorney, Agent, or Firm—Sughrue, Mion, Zinn, Macpeak & Seas

[57] ABSTRACT

A gearbox with a large number of ratios can be operated according to the laws of pressure variation with respect to the friction clutches provided for the engagement of the various ratios wherein the laws of pressure variation are no longer fixed but can be adapted to the various requirements for effective operation of the gearbox according to operative conditions of the vehicle in which the gearbox is installed. The valve units are exclusively electro-hydraulic proportional-responsive valve units. The operating conditions of the gearbox and the tractor in which it is installed are monitored by suitable devices which generate electrical signals indicative of the operating conditions. An electronic control unit is supplied with these signals and is arranged to pilot the electro-hydraulic proportional-responsive valves so as to regulate the manner of combined engagement and disengagement of the hydraulic clutches in dependence on the operative conditions.

13 Claims, 2 Drawing Sheets

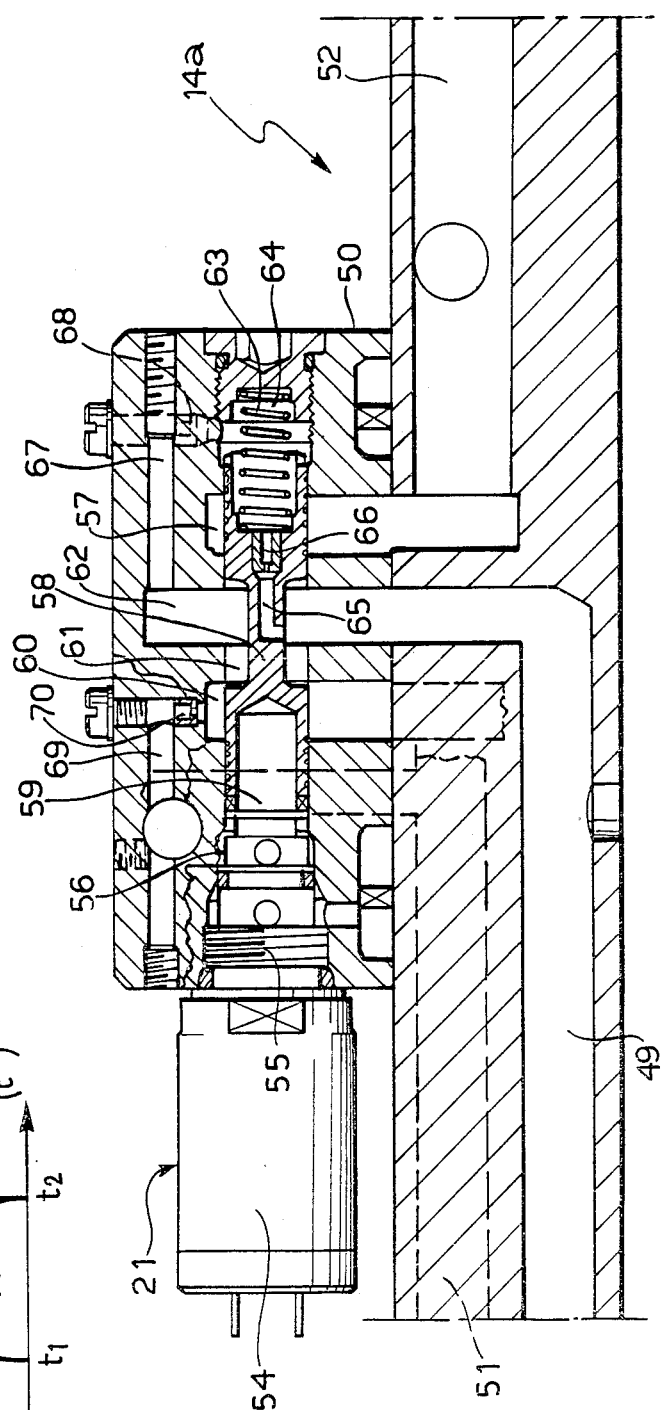

GEARBOX WITH ELECTRONICALLY-CONTROLLED HYDRAULIC CLUTCHES, FOR AGRICULTURAL TRACTORS AND SIMILAR VEHICLES

The present invention relates to gearboxes with a large number of ratios, for agricultural tractors and similar vehicles, of the type usually termed "power-shift" gearboxes.

These gearboxes include a driving shaft and a driven shaft which are parallel to each other and carry first and second reduction stages with permanently meshed gears defining a plurality of forward and reverse gear ratios which are engageable by means of first and second hydraulic friction clutch units whose engagement and disengagement is effected in a combinable manner by hydraulic distributor means operated by a first manual control and respective piloting valve units to effect gear changes without interrupting the transmission of torque between the driving shaft and the driven shaft, the hydraulic friction clutches of the first unit being operable as starting clutches by means of a control pedal, a flexible coupling operatively associated with the input of the driving shaft, and a final mechanical, geared speed-range reduction stage operatively associated with the output of the driven shaft and operable by means of a second manual control.

As is well known, gearboxes of this type offer the advantage of enabling a smooth and gradual transition between the various gear ratios, without interruption of the driving torque to the tractor wheels.

A gearbox of this type is described and illustrated, for example, in Italian patent application No. 69717-A/78 in the name of the same Applicant (to which U.S. Pat. No. 4,275,608 corresponds), in which engagement of the various gear ratios available is achieved precisely by combined disengagement and engagement of corresponding pairs of first- and second-stage friction clutches With suitable laws of variation of the pressures of the two friction clutches concerned, a gear change is achieved which is acceptable from the aspects of operation (wheels always under torque), of operator comfort and of the working life of the mechanical units concerned. The graph of FIG. 2 of the appended drawings shows schematically the traces of the pressures $p_1$ and $p_2$ of the two clutches concerned as functions of time, during the stage of changing of the gear ratio. In particular:

$p_1 = p_1(t)$ represents the trace of the thrust pressure of the friction clutch during the disengagement stage;

$p_2\ p_2(t)$ represents the trace of the thrust pressure in the friction clutch during the engagement stage.

The development of the laws of variation of the pressures $p_1$ and $p_2$ with time, particularly the value M of the pressure at which cross-over takes place, the duration delta $t = t_2 - t_1$, etc., are optimised experimentally and are achieved by means of regulating valves, calibrated holes and accumulators, inevitably resulting in behaviour which is fixed under all the conditions of use of the tractor: low or high torques, high or low operating speeds, inertial or resistive loads, use with equipment which is towed or operated from the power take-off.

This results in an operation conditioned by many compromises which obviously cannot take into account the actual conditions of loading, speed, and use of the tractor and which is thus often inadequate.

The object of the present invention is to produce a gearbox of the above-specified type which enables the achievement of laws of pressure variation, both in engaged and in disengaged friction clutches arranged for the engagement of the various ratios, which are no longer fixed but can be adapted to the various requirements for effective operation of the gearbox and to the operative conditions of the vehicle in which the gearbox is installed.

According to the invention this object is achieved by virtue of the fact that the valve units include electro-hydraulic proportional-response valve units, and in that there are provided means for monitoring the operative conditions of the gearbox and of the tractor in which it is installed, which are adapted to generate electrical signals indicative of these conditions, and an electronic control unit which is supplied with these signals and is arranged to pilot the electro-hydraulic proportional-response valves so as to regulate the manner of combined engagement and disengagement of the hydraulic clutches in dependence on the operative conditions.

In this way there is obtained complete and automatic flexibility of operation of the gearbox by means of information which identifies and characterises the use of the tractor, and corresponding adjustments of the laws of variation of the pressures of the hydraulic friction clutches concerned during the changing of the gear ratios.

In practice, this translates into optimal operation of the gearbox, better comfort for the operator, and greater protection of the working life of the mechanical units concerned.

A further advantage of the invention is that it enables some automatic operations to be achieved in certain operating situations, including:

selection of the most suitable gear ratio during the stage of manual changing of the speed range by operation of the manual control of the final range-reduction stage. This selection is effected, as will be made clear in more detail below, on the basis of the monitoring of the speed of the tractor before and during the stage of manual changing of the gear ratio;

identification of the best gear ratio for ensuring particular operative conditions (for example, maximum productivity of the tractor, minimum consumption, etc.). Selection of the best ratio in this case is possible on the basis of information relating to the rate of revolution of the engine, the introduction of fuel slippage of the tyres, etc. In this case, the best ratio may simply be indicated visually by the electronic control unit, or it may be directly engaged automatically when conditions occur which are necessary for engagement of this ratio for the purpose of the most correct and convenient use of the means, according to predetermined programmes.

A further advantage of the invention lies in the possibility of grouping the hydraulic actuators of the clutches of the first and second stages (distributor and electro-hydraulic proportional-response valves) in a single unit of compact dimensions.

Obviously, as well as sensors indicative of the gear ratio selected, the means for monitoring the operative conditions may include sensors indicative of the loading parameters of the engine of the tractor and of the forward speed thereof, range sensors associated with the second manual control, and a sensor of the disengagement of the starting friction clutch, associated with the control pedal.

To advantage, the gearbox according to the invention is also provided with a hydraulic brake associated with the driving shaft and operated by the electronic unit, by means of a solenoid valve associated with the hydraulic distributor, upon disengagement of the starting friction clutch.

Hydraulic lubricating and cleaning means are normally associated with the hydraulic-friction clutches of the first and second stages. The gearbox according to the invention further includes a solenoid cut-off valve operated by the electronic control unit to stop the lubrication upon disengagement of the starting friction clutch.

The invention will now be described in detail with reference to the appended drawings, in which:

FIG. 1 is a schematic longitudinal section of a gearbox for agricultural tractors according to the invention, FIG. 2 is a graph which shows schematically the manner of operation of gearbox with hydraulic clutches, according to the prior art, and FIG. 3 is a section of a part of a component of the gearbox of FIG. 1.

With reference to FIG. 1, a "power-shift" gearbox according to the invention with a large number of ratios, fitted to an agricultural tractor, is generally indicated 1. The general conformation of the gearbox 1, as well as the way in which it is mounted in the tractor, are known from the above-mentioned Italian patent application No. 69717-A/78 (U.S. Pat. No. 4,275,608).

For the purposes of the invention, it is sufficient to say that the gearbox 1 includes a driving shaft 2 and a driven shaft 3 which are parallel to each other, the first of which is rotated by the shaft 4 of the tractor engine through a flexible coupling, generally indicated 5.

A final range-reducer of the conventional mechanical type with gears, generally indicated 7, is arranged at the output of the driven shaft 3. The range-reducer 7, through which is driven an output shaft 8 for transmission of the drive to the tractor wheels, is operated by a selection lever 9 to achieve three speed ranges, slow "L", intermediate "M" and fast "V", respectively.

The driving shaft 2 and the driven shaft 3 are associated respectively with first and second reduction stages, generally indicated 10 and 11, of the type having permanently meshed gears defining a plurality of forward and reverse gear ratios. The general characteristics of the two stages 10 and 11 correspond generally to those described in the above-mentioned Italian patent application and will not therefore be described in detail. For the purposes of the invention, it is sufficient to explain that engagement and disengagement of the various gear ratios available is achieved through first and second clutch units, generally indicated 12, 13, coaxial with the driving shaft 2 and the driven shaft 3, respectively. Each clutch unit 12, 13 comprises three hydraulic friction clutches, designated B, A, RM and E, D, C respectively, whose conformation will not be described in detail, since it is known from the above-mentioned Italian patent application.

The hydraulic friction clutches of the two units 12, 13 are operated hydraulically by means of a hydraulic distributor unit 14 containing slide valves operable, in the manner made clear below, to pass pressurised hydraulic fluid selectively to the various clutches. The pressurised hydraulic fluid is supplied through the distributor unit 14 by a suitable source, such as, for example, an open-circuit hydrostatic steering system of the tractor, generally indicated 15, which is in turn supplied by a geared pump 16 with a distributor, driven by the tractor engine. Hydraulic apparatus of this kind is well known to experts in the art and it is therefore not thought necessary to describe it in detail.

The distributor 14, which will be described in more detail below with reference to FIG. 3, is arranged to combine the engagement and disengagement of the six friction clutches according to a prearranged scheme so as to achieve the following combinations corresponding to six forward gear ratios and three reverse gear ratios, naturally, for each of the three speed ranges "L", "M" and "V" selected by the lever 9:

FORWARD:
sixth gear B-E
fifth gear A-E
fourth gear B-D
third gear A-D
second gear B-C
first gear A-C
REVERSE:
first gear C-RM
second gear D-RM
third gear E-RM In practice, the gearbox 1 enables the provision of a total of eighteen forward gear ratios and nine reverse gear ratios.

Returning to FIG. 1, a hydraulic brake acting on the driving shaft 2 and operated by the distributor 14 through an "on-off" valve 18 is indicated 17 and has the function, as will become clearer below, of overcoming the natural drag of the hydraulic clutches, particularly with cold oil, and thus of keeping the tractor safely stopped when the gearbox is in neutral.

The friction clutches of the two units 12 and 13 are connected to a hydraulic lubricating and cooling circuit, generally indicated 19, in which is inserted a solenoid cut-off valve 20 which can be operated in the manner made clear below to shut off or choke the lubrication in order to reduce power absorption during normal operation and limit the drag of the clutches of the two units 12 and 13 in the neutral condition of the gearbox, when cold.

According to the invention, the operation of the hydraulic friction clutches of the two units 12 and 13 by the distributor 14 is effected through respective three-way proportional solenoid valves, indicated 21 (clutch A), 22 (clutch D), 23 (clutch B), 24 (clutch RM), 25 (clutch C) and 26 (clutch E). These proportional solenoid valves 21-26, which, to advantage, are fitted directly to the body of the distributor 14 together with the solenoid valve 18 of the hydraulic brake 17, are connected electrically to a microprocessor electronic control unit 27 to which the solenoid valves 18 and 20 are also connected.

The unit 27 is provided with a control panel carrying a series of six push-buttons 28 by means of which the engagement of the six forward gear ratios is effected, a series of three push-buttons 29 for engagement of the three reverse gears, a push-button 30 for reversing the drive, a three-position knob 31 with spring-return to the central position, for changing in sequence to a lower gear ratio or a higher gear ratio, a push-button 32 for emergency control, a push-button 33 for enabling and disabling the automatic change-down of the gear ratio, a gear-ratio indicator 34 for indicating whether the engine will permit a higher gear than that which is selected, and an illuminated control panel 35.

The push-buttons 28 and 29, which have associated indicator lights for indicating the gear ratio engaged, operate the various possible combinations of the hydraulic friction clutches of the two units 12 and 13, described above, through the respective solenoid proportional-response valves 21-26. In particular, the use of the solenoid proportional-response valves 21-26 enables the laws of variation of the pressures in the hydraulic clutches of the units 12 and 13 disengaged and engaged during a change of gear ratio to be adjusted to the actual use of the tractor during the change. This adjustment is carried out by the electronic control unit 27 which pilots the solenoid valves 21-26 in a corresponding manner, in response to signals corresponding to the actual operating conditions of the tractor. These signals are supplied to the unit 27 through a series of electrical sensors or transducers, more particularly: a vehicle-speed sensor 36, a sensor 37 of the rate of revolution of the engine, a sensor 38 of the position of the accelerator lever of the vehicle, a unit 39 for detecting the speed range selected by the control lever 9, and a sensor 40 of the angular-potentiometer type for detecting the position of a pedal 6 controlling starting, that is, starting of the tractor from rest. For starting, of the three friction clutches A, B, RM is used: more precisely, the clutches A, B are used for forward travel and the clutch RM for reverse. When starting, these clutches are operated by the pedal 6 through the potentiometer 40, the unit 27, and the corresponding solenoid valve 21, 23 or 24. The operation is adjustable at will by the operator, since there is a predetermined unambiguous linear relationship between the position of the pedal 6 and the operating pressure of the clutch used for starting. This unambiguous relationship is determined electrically by the potentiometer 40 which sends a signal to the unit 27 which in turn supplies to the solenoid valve 21, 23 or 24 a current "i" which is variable with the position of the pedal. The solenoid valve in turn sends oil to the clutch at a Pressure which is directly proportional to the current "i" sent to the solenoid valve.

A sensor (not shown) is also provided for enabling the engine to be started, constituted, for example, by a push-button operated at the last stage of the downward travel of the pedal 6 and combined with the neutral position of the speed-range control lever 9.

By means of the electrical signals supplied by the sensors 36-40, the electronic control unit 27 is able not only to optimize the laws of variation of pressure to the hydraulic friction clutches of the two units 12 and 13 on the basis of the actual conditions of use of the tractor, but also to select and indicate the most suitable gear ratio during manual changing of the ranges, in relation to the speed and type of work of the tractor, as well as to carry out a gear change automatically when conditions necessitating the gear change occur during working or travelling, for the purpose of the most correct and convenient use of the tractor according to predetermined programs (maximum productivity, minimum consumption, etc).

In practice, by means of the information from the various sensors, the processing thereof by the unit 27, and the corresponding piloting of the solenoid proportional-response valves 21-26, the laws of variation of the pressure of the hydraulic clutches concerned in the various gear changes are no longer fixed as in the case of conventional gearboxes, as illustrated in FIG. 2, but are variable in dependence on the requirements of operation of the gearbox and of the vehicle. In other words, the pressure value indicated M in FIG. 2, at which cross-over occurs between the falling pressure of the clutch which is being disengaged and the rising pressure of the clutch which is being engaged is variable as the duration delta $t = t_2 - t_1$ is variable.

As well as controlling the proportional solenoid valves 21-26, the electronic unit 27 also provides automatic control of the "on-off" solenoid valve 18 of the hydraulic brake 17 and of the solenoid cut-off valve 20 of the lubricating circuit 19.

With reference to FIG. 3, the configuration of the distributor 14 will now be described in detail. The distributor 14 is constituted by as many proportional solenoid valves (21-26) and as many amplifying slide valves (58) as there are clutches (A, B, RM, C, D, E).

Essentially, each clutch is supplied by a section of the distributor 14 exactly the same as that indicated 14a in FIG. 3. This comprises a body 50 in which are formed a main supply chamber 57 communicating with a general supply line 52, a delivery chamber 62 communicating through a duct 49 with the thrust member of the friction clutch, and an inlet chamber 56 which is reached by a line for a controlled pressure (approximately 18 bars) flowing from the line 52 into a line 51 which communicates with the chamber 56. This pressure therefore arrives at the inlet chamber 56 to the hydraulic cartridge 55 of the proportional solenoid valve 21, whose electromagnet 54 is fixed to the body 50.

An amplifying slide valve 58 is movable in the body 50 and at one end has a chamber 59 adapted to be supplied by the solenoid valve 21 and at the opposite end has a chamber 64 communicating with the duct 49 through an internal passage 65 and a choke 66. Alternatively, the connection between the duct 49 and the chamber 64 may be achieved through a duct 67 and a choke 68 outside the slide 58, in the manner also shown in FIG. 3.

A helical compression spring 63 is interposed between the base of the chamber 64 and the body 50.

A discharge chamber which, in the position of the slide valve 58 illustrated in the drawing and corresponding to the de-energized condition of the solenoid valve 21, communicates with the chamber 62 through a passage 61 is indicated 60.

The discharge chamber 60 also communicates with the chamber 56 through a passage 69 and a calibrated adjustment hole 70.

In operation, when a piloting current "i" arrives at the electromagnet 54 of the solenoid valve 21 from the electronic unit 27, the solenoid valve 21 sends to the chamber 59 of the slide valve 58 a presure "p" which is proportional to the current "i". The slide valve. 58 is consequently displaced towards the right with reference to the drawing, isolating the chamber 62 and the duct 61 from the discharge chamber 60. As the slide valve 58 moves towards the right, it puts the chamber 62, which, as stated, communicates with the thrust member of the hydraulic clutch of the gearbox, into communication with the main supply chamber 57. The pressurized oil can thus reach at the trust member of the clutch. The pressure in the chamber 62, and therefore on the trust member of the clutch, will have a value given by the following relationship:

pa.A = pb.A + Fm where:

pa = the piloting pressure supplied to the thrust chamber 59 by the solenoid valve 21;
pb=the pressure in the delivery chamber 62 and in the reaction chamber 65;
Fm=the force of the spring 63;
A=the thrust area of the slide valve 58, the slide valve 58 being in equilibrium between the thrust of the pressure pa and the thrust of the reacting pressure pb of the chamber 64, which, as stated, reaches at the latter through the passage 65 and the choke 66 or, alternatively, through the duct 67 and the choke 68.

The duct 59 and the calibrated hole 70 have the purpose of facilitating the regulation of the pressure (curve of FIG. 2) after the thrust member of the friction clutch has moved the friction discs together and the solenoid valve and the distributor must thus regulate the pressure without a flow of oil. The small leakage through the calibrated hole 70 enables the supply of a discharge flow of oil by the solenoid valve 21 during this regulation stage.

The operation of the gearbox according to the invention will now be described in detail below with reference to the various possible operating conditions.

Tractor stopped with the starting clutch disengaged In this condition, defined unambiguously by the lowered position of the pedal 6 operating the starting friction clutch A, B or RM and by the transmission rate, all the hydraulic friction clutches of the two units 12 and 13 are discharged and thus disengaged, whilst the hydraulic brake 17 is activated.

At this stage, the cut-off valve 20 is activated to prevent or choke the washing of the hydraulic clutches of the two units 12 and 13, in order to reduce the drag of the clutches and thus to facilitate engagement of the speed ranges "L", "M" and "V" when the oil is cold.

Starting from rest

This is executed by operation of the pedal 6 after preselection of the gear by means of one of the push-buttons 28 or 29. The electronic unit 27 carries out the sequence indicated below, it being borne in mind that the dimensioning of the hydraulic friction clutches of the first reduction stage 10 is such as to enable starting in any one of the gear ratios within the scope of the slow "L" and intermediate "M" speed ranges:
  disengagement of the solenoid valve 20 which prevents or chokes the lubrication, so as to ensure complete lubrication of the friction clutches during starting,
  engagement of the preselected hydraulic friction clutch (C, D or E) of the second reduction stage 11,
  disengagement of the hydraulic brake 17,
  modulation by the operator, through the pedal 6, of the operating pressure of the corresponding hydraulic friction clutch (A, B or RM) of the first reduction stage 10 in proportion to the position of the pedal 6,
  re-activation of the solenoid valve 20 to prevent or choke the washing upon completion of starting, with a sufficient delay to limit any overheating of the hydraulic friction clutches.

As far as the "V" speed range is concerned, the unit 27 always arranges for starting with the first gear ratio, after which any preselected gear ratio is attained automatically by sequential changes.

Gear change

The change from one gear ratio to another takes place in the following manner:
  prefilling of the engaged hydraulic clutch (or clutches). The duration of this stage depends on the dimensional parameters of the clutch and on the time elapsed since the last disengagement of the same gear, to avoid possible overlapping of the clutches;
  simultaneous modulation of the pressures of engagement of the engaging hydraulic friction clutches and of disengagement of the disengaging hydraulic friction clutches, according to laws determined by the unit 27.

The parameters defining these laws are calculated in dependence on the operating conditions detected by the sensors concerned at the time the gear is changed.

Sequence for changing gear and reversing the drive

This sequence must take place in the manner described in the preceding paragraph, the gear ratios engaged in sequence to "change up" or "change down" until the gear selected by the operator is reached.

If the sequence involves a reversal of the direction of travel of the vehicle caused by preselection of the reverse drive and gear and enabled by the appropriate push-button 30 of the unit 27, during the change from the first forward gear to the first reverse gear (or vice versa), the unit 27 must prevent the activation of the hydraulic clutches of reverse gear from starting before the tractor has stopped.

Change of range without stopping the tractor

The selection of the range "L", "M" or "V" takes place with the pedal 6 completely depressed, and the electronic unit 27 then causes all the hydraulic friction clutches of the two units 12 and 13 to be put into discharge and the flow of lubricant to be stopped or choked by means of the intervention of the solenoid valve 20, and the hydraulic brake 17 to be activated when the speed of the tractor is less than a threshold value, for example, 3 km/hour.

These operations must be able to free the driven shaft 3 of the gearbox within a period of time which enables synchronisation of the range selected in a time interval of between 0.5-1 second and 2 seconds.

Upon release of the pedal 6, the control unit 27 automatically selects the gear which achieves the transmission ratio nearest to the ratio between the driving rate and the driven rate, with possible rounding up to the "higher" gear if the change of range takes place "upwards", or to the "lower" gear .if the change of range takes place "downwards".

Stopping the tractor

At the stage of stopping of the tractor, upon operation of the pedal 6 with the range control lever 9 not displaced or in the neutral position, the unit 27 carries out the following sequence:
  disengagement of the hydraulic friction clutch in contact with the first stage 10 (A, B, RM);
  disengagement of the hydraulic friction clutch in contact with the second stage 11 (C, D, E);
  engagement of the hydraulic brake 17.

Automatic functions

For the slow "L" and medium "M" speed ranges, it is possible to select an automatic gearbox control function by means of the push-button 33. The operator thereby selects a gear ratio which is considered to be the best with reference to the work being carried-out by the tractor, and the unit 27 automatically carries out any downward gear changes (at the most, two gears) when the engine load becomes excessive and, as soon as the operating conditions of the engine permit, restores the gear selected by the operator.

Further possible automatic functions achieved by the unit 27 consist, for example, of identification of the most suitable gear ratio upon variation of the range, through the tractor speed sensor 36 by means of whose signals the most suitable gear is identified from those available in the preselected-range This function can be explained with reference to the following examples.

It is assumed that the tractor is in transit or travelling on the road and the lever 9 is operated to change from the fourth gear ratio of the medium range "M" to the fast range "V". In this case, the unit 27 identifies the gear ratio of the fast range "V" which is nearest to the speed of the tractor at the time of engagement of the fast range "V": the gear ratio selected in this case would probably be the first.

Now, if it is assumed that the tractor is in the same situation as in the preceding case, and the range is changed from fast "V" to medium "M": the gear ratio selected by the unit 27 could be the fourth of the medium range "M" if the tractor has lost little speed during the time taken to change the range, but could be the third, second or even the first if the tractor has lost a lot of speed during the time taken to change the range.

Alarms and emergency operation

As well as the normal "checking" functions of the electronic control system, at least the function of checking for slippage of the friction clutches under load is provided and can be carried out by suitable processing of the driving and driven rate signals by means of the unit 27. In this situation, the unit 27 is able to provide an alarm signal.

In the event of damage to the electronic control system, the operator is nevertheless able to select an emergency mode of operation of the gearbox by means of the push-button 32, so as to enable starting and movement of the tractor at least in the first forward and reverse gear ratios.

Naturally, the details of construction and forms of embodiment of the invention may be varied widely with respect to those described and illustrated, without thereby departing from the scope of the present invention.

We claim:

1. A gearbox with a large number of ratios, for agricultural tractors and similar vehicles, including a driving shaft and a driven shaft which are parallel to each other, first and second reduction stages carried by the driving shaft and the driven shaft and having permanently meshed gears defining a plurality of forward and reverse gear ratios, first and second hydraulic friction clutch units for engaging the gear ratios of the first and second reduction stages, hydraulic distributor means for engaging and disengaging the first and second clutch units in a combinable manner, a first manual control and respective piloting valve units for operating the distributor means to effect gear changes without interrupting the transmission of torque between the driving shaft and the driven shaft, a control pedal for operating the hydraulic friction clutches of the first unit as starting clutches, a flexible coupling operatively associated with the input of the driving shaft, a final mechanical, geared speed-range reduction stage operatively associated with the output of the driven shaft, and a second manual control for operating the final reduction stage, wherein the valve units include exclusively electro-hydraulic proportional-response valves, and wherein there are provided means for monitoring the operative conditions of the gearbox and of the tractor in which it is installed, which are adapted to generate electrical signals indicative of these conditions, and an electronic control unit which is supplied with these signals and is arranged to pilot the electro-hydraulic proportional-response valves so as to regulate the manner of combined engagement and disengagement of the hydraulic clutches in dependence of the operative conditions according to variable laws of pressure variation of said hydraulic clutches.

2. A gearbox according to claim 1, wherein the monitoring means include means for sensing the load of the engine and means for sensing the speed of advance of the tractor.

3. A gearbox according to claim 2, wherein the monitoring means also include range sensor means associated with the second manual control, and the electronic control unit is also arranged to identify the most suitable gear ratio from the gear ratios available within the scope of the range selected as a result of a manual change from one range of ratios to another range of ratios, in relation to the operative conditions of the tractor, and to provide corresponding visual information.

4. A gearbox according to claim 3, wherein the electronic control unit is also arranged to cause automatic engagement of the most suitable gear ratio in relation to the operative conditions of the tractor.

5. A gearbox according to claim 3, wherein the electronic control unit is also arranged to prevent activation of the hydraulic clutches of reverse gear before the tractor has stopped, when the direction of travel is reversed.

6. A gearbox according to claim 3, wherein the electronic control unit is also arranged to operate a function of checking for slippage of the friction clutches under load and to activate a corresponding alarm signal.

7. A gearbox according to claim 3, wherein the electronic control unit is provided with a manual emergency selector for enabling selection of an emergency mode of operation of the gearbox, in which starting and movement of the tractor are possible, at least in the first forward and reverse gear ratios, in the event of damage to the control unit.

8. A gearbox according to claim 3, wherein the monitoring means also include means for sensing the disengagement of the starting clutches, and wherein the gearbox further includes a hydraulic brake associated with the driving shaft and operated by the electronic unit through a solenoid valve associated with the hydraulic distributor upon disengagement of the starting clutches.

9. A gearbox according to claim 8, wherein hydraulic lubrication means are associated with the hydraulic friction clutches and the gearbox also includes a solenoid cut-off valve operated by the electronic control unit to stop lubrication on engagement of a speed range by means of the second manual control and to re-establish this lubrication following engagement of the preselected speed range.

10. A gearbox according to claim 1, wherein the hydraulic distributor means include a plurality of distributor sections each of which includes a respective proportional solenoid valve and is associated with a respective hydraulic friction clutch, each distributor section having a main supply chamber, a general supply line communicating with the main supply chamber, a chamber for delivery to the hydraulic friction clutch, and an inlet chamber supplied at regulated pressure by the supply duct and operatively associated with the proportional solenoid valve, an amplifying slide valve, which has at one end a thrust chamber adapted to be supplied by the solenoid valve and at the opposite end a reaction chamber communicating with the delivery chamber, being arranged to shut off communication between the delivery chamber and a discharge chamber and to establish communication between the delivery chamber and the main supply chamber as a result of the excitation of the proportional solenoid valve by the electronic unit and of the consequent supply thereby of a piloting pressure to the thrust chamber of the slide valve against the action of the reaction pressure in the reaction chamber of the slide valve.

11. A gearbox according to claim 10, wherein the reaction chamber of the slide valve communicates with the delivery chamber through a passage and a choke within the slide valve.

12. A gearbox according to claim 10, wherein the reaction chamber of the slide valve communicates with the delivery chamber through a duct and a choke outside the slide valve.

13. A gearbox according to claim 10, wherein the inlet chamber communicates with the discharge chamber through a calibrated passage for regulating the pressure.

* * * * *